United States Patent
Colombo et al.

(10) Patent No.: US 8,527,077 B2
(45) Date of Patent: Sep. 3, 2013

(54) SERVICE-ORIENTED AUTOMATION DEVICE AND METHOD FOR SPECIFYING A SERVICE-ORIENTED AUTOMATION DEVICE

(75) Inventors: Armando Walter Colombo, Karlstein (DE); Joao Marco Mendes, Ponte de Lima (PT)

(73) Assignee: Schneider Electric Automation GmbH, Seligenstadt (DE)

( * ) Notice: Subject to any disclaimer, the term of this patent is extended or adjusted under 35 U.S.C. 154(b) by 359 days.

(21) Appl. No.: 12/918,824

(22) PCT Filed: Feb. 20, 2009

(86) PCT No.: PCT/EP2009/052085
§ 371 (c)(1),
(2), (4) Date: Oct. 27, 2010

(87) PCT Pub. No.: WO2009/103811
PCT Pub. Date: Aug. 27, 2009

(65) Prior Publication Data
US 2011/0066268 A1    Mar. 17, 2011

(30) Foreign Application Priority Data
Feb. 22, 2008 (DE) .......................... 10 2008 002 782

(51) Int. Cl.
*G06F 17/00*     (2006.01)
*G06F 19/00*     (2011.01)

(52) U.S. Cl.
USPC ................................. 700/96; 700/29; 700/97

(58) Field of Classification Search
USPC ................ 700/28, 29, 31, 95, 96, 97, 99, 100
See application file for complete search history.

(56) References Cited

U.S. PATENT DOCUMENTS

| | | | |
|---|---|---|---|
| 6,067,357 A * | 5/2000 | Kishinsky et al. | 379/265.02 |
| 6,256,598 B1 * | 7/2001 | Park et al. | 703/2 |
| 6,459,944 B1 * | 10/2002 | Maturana et al. | 700/100 |
| 6,463,360 B1 * | 10/2002 | Terada et al. | 700/257 |
| 6,725,113 B1 * | 4/2004 | Barto et al. | 700/99 |
| 7,151,966 B1 | 12/2006 | Baier et al. | |
| 8,010,333 B2 * | 8/2011 | Colombo et al. | 703/13 |

(Continued)

OTHER PUBLICATIONS

Mendes et al "Behaviour and Integration of Service-Oriented Automation and Production Devic[es] at the Shop-Floor" Proms Virtual Int. Conf., Apr. 2008, pp. 1-6.

(Continued)

Primary Examiner — Charles Kasenge
(74) Attorney, Agent, or Firm — Ladas & Parry, LLP

(57) ABSTRACT

A method for specifying the behavior of autonomous and collaborative automation devices in manufacturing plants with a service-oriented architecture and to a service-oriented automation device. In order to describe the operating behavior of such devices, the invention proposes the steps of original setting-up of the automation device, including configuration, depiction of services, establishment of connections to other automation devices and transfer of the set-up to waiting original status, receiving the events through service operations, internal device interfaces of inputs/outputs and/or generated directly from the controls, evaluating the received events, executing the events and changing the state of the model-based middleware shell, wherein the system achieves the next state and is capable of receiving further events.

8 Claims, 5 Drawing Sheets

(56) References Cited

U.S. PATENT DOCUMENTS

Figure 1:
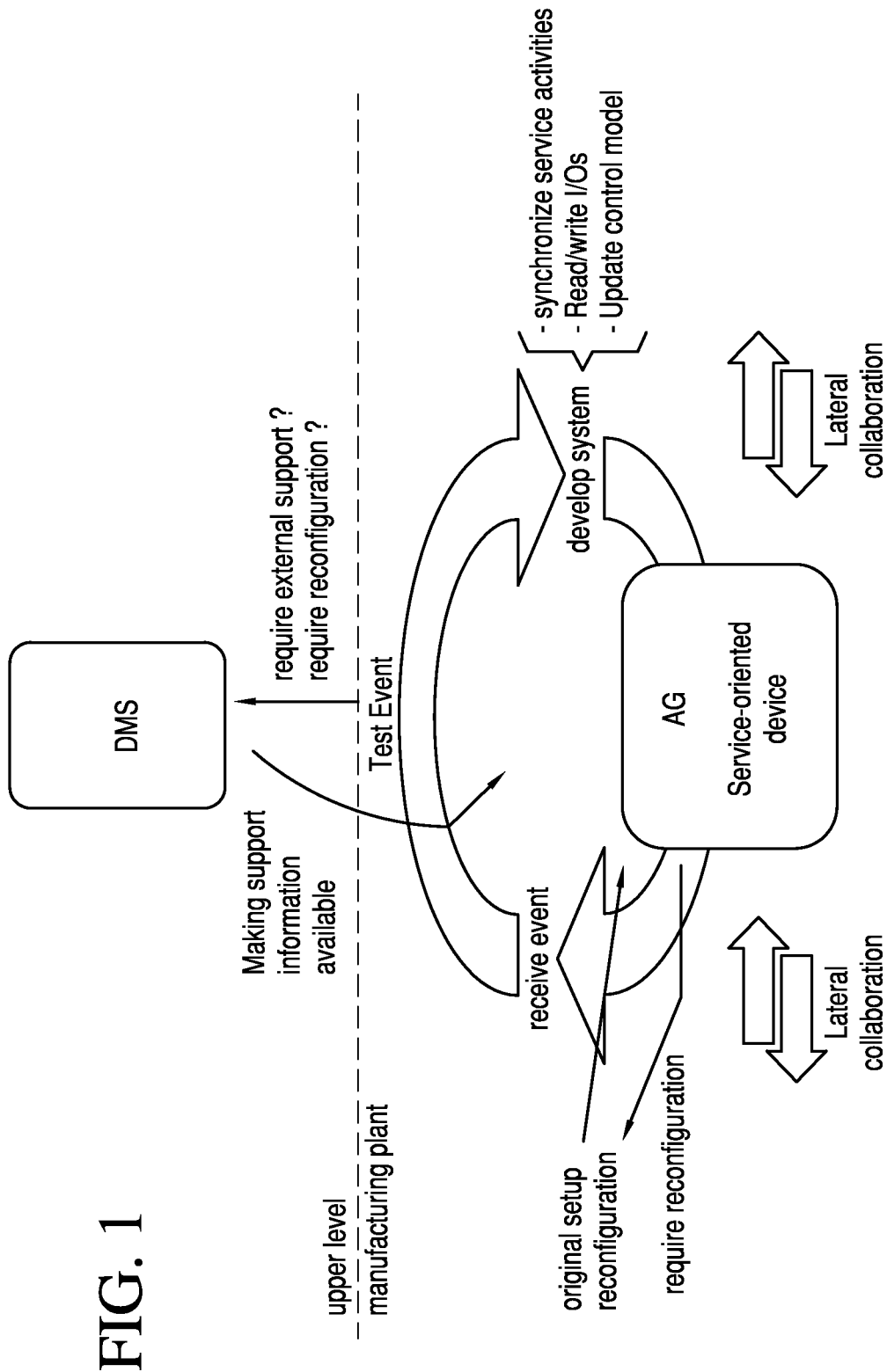

| | | | |
|---|---|---|---|
| 2002/0152000 A1* | 10/2002 | Landers et al. | 700/98 |
| 2002/0165623 A1* | 11/2002 | Haller et al. | 700/31 |
| 2003/0176940 A1* | 9/2003 | Rangachari et al. | 700/121 |
| 2006/0015315 A1* | 1/2006 | Colombo et al. | 703/22 |
| 2006/0155411 A1* | 7/2006 | Khoche et al. | 700/108 |
| 2008/0255680 A1* | 10/2008 | Kappelhoff et al. | 700/7 |

OTHER PUBLICATIONS

Jammes et al "Service-Oriented Paradigms in Industrial Automation" IEEE Transactions on Ind. Inf., Feb. 2005, pp. 62-70.

Leitao et al "Petri Net Based Methodology for the Development of Collaborative Production Systems" IEEE Conf., pp. 819-826.

Jammes et al "Service-Oriented Architectures for Devices-the SIRENA View" IEEE Int. Conf., Aug. 2005, pp. 140-147.

* cited by examiner

SERVICE-ORIENTED AUTOMATION DEVICE AND METHOD FOR SPECIFYING A SERVICE-ORIENTED AUTOMATION DEVICE

The invention relates to a service-oriented automating device for manufacturing plants with service-oriented architecture as well as to a process for specifying such a device.

The idea describes a trial solution as well as the associated process standing behind the operable behavior of autonomous and collaborative automating devices in manufacturing plants with service-oriented architecture (SoA). As regards the context, the idea focuses on setup- and operating phases in the life cycle of collaborative SoA-based production systems. These systems are composed of distributed, reconfigurable, intelligent production automating devices that define their functionality as services or aggregation of these services. The trial solution/the process makes possible, after the initial setup of the automatic function of the device and the definition of its service, the collaborative interaction/cooperation in order to pursue flexible and client-specific workflows associated with the product to be manufactured. Under the roof of the service-oriented architecture paradigm the orchestrated services made available by the production devices behave as

- lateral/horizontal (device-device) relationship, calling up of service or conversation with services such as, e.g., move pallet in, take gripper, transport pallet up, etc.
- vertical (device-MES (Manufacturing Execution System) and devices-DMS (Decision-Making-Systems) relationship, calling up of services offered by higher components of a higher level for dynamic reorganization of production questions/automating questions, conversation with service such as monitoring/diagnosis information/indices, etc.

The process describes the autonomous behavior of service-oriented production automating devices in the manufacturing plant and as part of an IT company system. The devices have a degree of autonomy in the sense of automatic load-bearing control and defining of necessary services for making possible lateral/horizontal collaboration with other devices (aggregation of services), inquiry/making services available for decision-making information of MES/DMS and integration. All interactions and accessing of resources take place via service orientation. There is a "loose-coupling" transmission in the form of a bottom-up perspective (from the devices/manufacturing-plant level) that increases the autonomy and consequent reconfiguration properties.

If the manufacturing plant is modeled into an SoA architecture, the behavior of each intelligent production automating device is a part of a middleware envelope that is formally specified by, e.g., high-level Petri net (HLPN) models and is supported by routines for treating non-documented events and decides about conflicts present in the behavior of the device.

The operable behavior of these devices follows the "mark movement" (token game: dynamic change of net marks according to Petri net rules. The change takes place by the movement of marks (tokens) between places produced by the initiation of transitions) of the HLPN; it is then self-controlling and/or self-monitoring and is guided by internal/external events that connect the envelope to other components of the SoA. These events can also correspond to service calls.

The using of this process results in autonomous devices that are self-controlling and/or self-monitoring and have fewer dependencies on other components, in particular in upper levels such as, e.g., decision-making systems. In short, the features of these devices are:

- service orientation, event-based development following the rules of the "token game" of an HLPN;
- autonomous control and consequent behavior;
- event-based lifecycle follows the rules of, e.g., "token game" of an HLPN;
- handling of documented events and exceptions of the customary control.

The goal of the suggestion of the patent is to make available the formalization of the operating behavior of autonomous and collaborative automating devices in manufacturing plants with service-oriented architecture (SoA).

The following themes summarize the initial advantages of the application of the idea:

An operation performed by a production automating device is a service that is offered by the device and that can be called up by other devices of the manufacturing plant or by other components of the SoA-based IT company system on account of the collaborative relationships. The topology of the SoA-based manufacturing plant allows the calling up of services observing "reserving of resources" (allocation of resources), jointly used resources (shared resources), limited mechatronics and information performance specifications.

Each device has an autonomous SoA-based control behavior that is locally in the device, which is connected, however, to other devices based on the layout configuration of the manufacturing plant. The middleware envelope makes these possible behavior connections available based on the disposition/calling up of services.

Decision mechanisms associated with the behavior of aggregated service are local to the adjacent devices but can also be influenced by information connected to the entire system, including the manufacturing plant (lateral collaboration) and higher-level components (vertical collaboration of the SoA-based IT company system.

The complete behavior of the manufacturing plant is based on the asynchronous exchange of events and the calling up of services carried out by intelligent distributed devices and this behavior formally follows the "token game" of the HLPN-based, SoA-based model.

This possibility offered by the SoA-based manufacturing plant, namely, to manage the workflow based on local conflicts among services assigned to the associated mechatronic devices (production automating device), enormously improves the flexibility of the production system. Dynamic reorganization properties are system-immanent and make possible the processing of many different types of products at the same time without reprogramming controls and/or waiting for a complete reorganization of the production.

Based on a workflow associated with the product, conflict situations in the manufacturing plant can be solved by calling up necessary services offered by a DMS component or an MES component. Every time a decision is made, a service is called up from a set of possible executable services. Whenever the service has been carried out a new local status of the device is achieved and the corresponding marking of the HLPN is developed. Note: the token movement in the HLPN represents, e.g., logical information connected to the manufacturing plant topology (SoA middleware) and/or physical information connected to the pallet/product movement in the manufacturing plant.

Further details, advantages and features of the invention result not only from the claims, the features to be gathered from them either alone and/or in combination but also from the following description of an exemplary embodiment to be gathered from the drawings.

Figure 2:
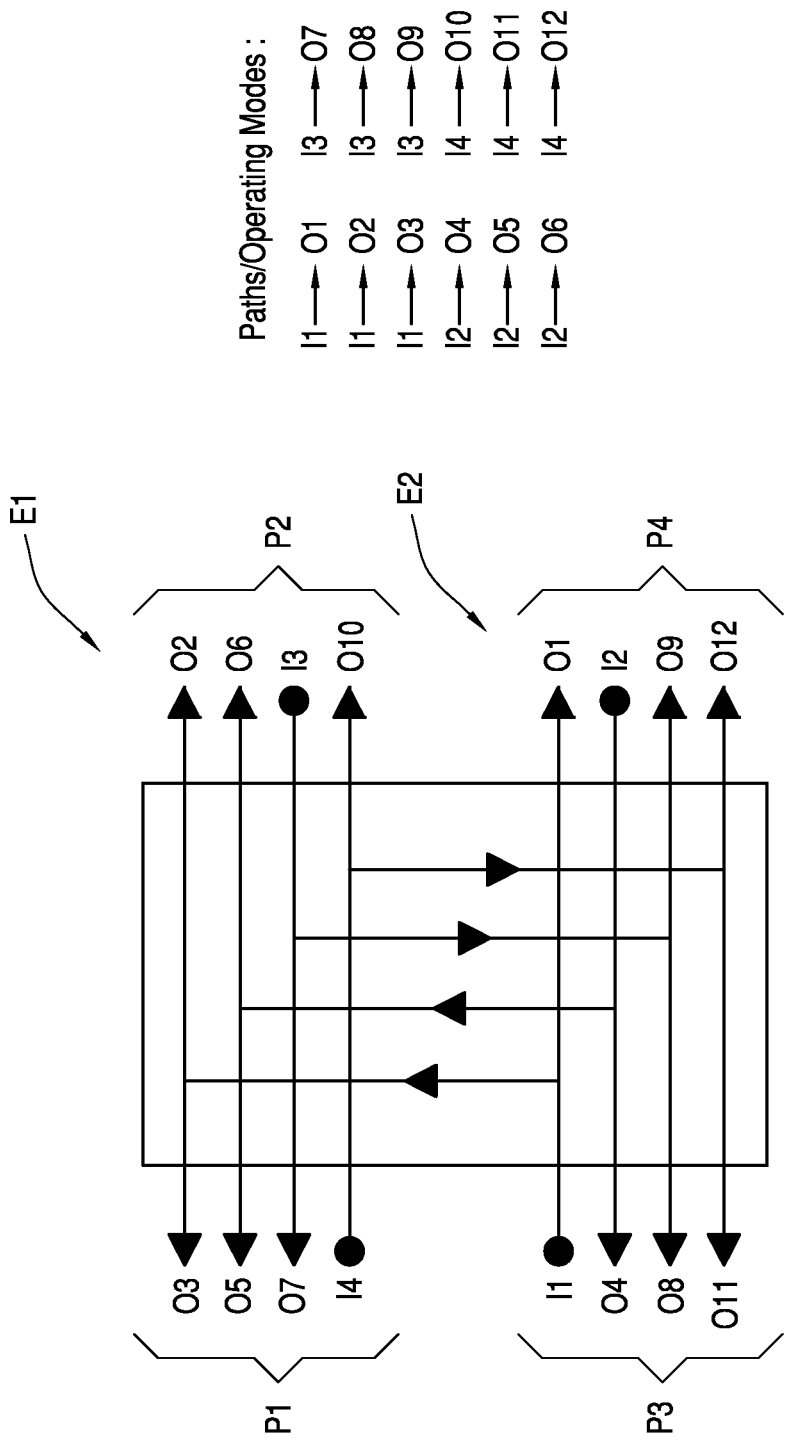
Figure 3:
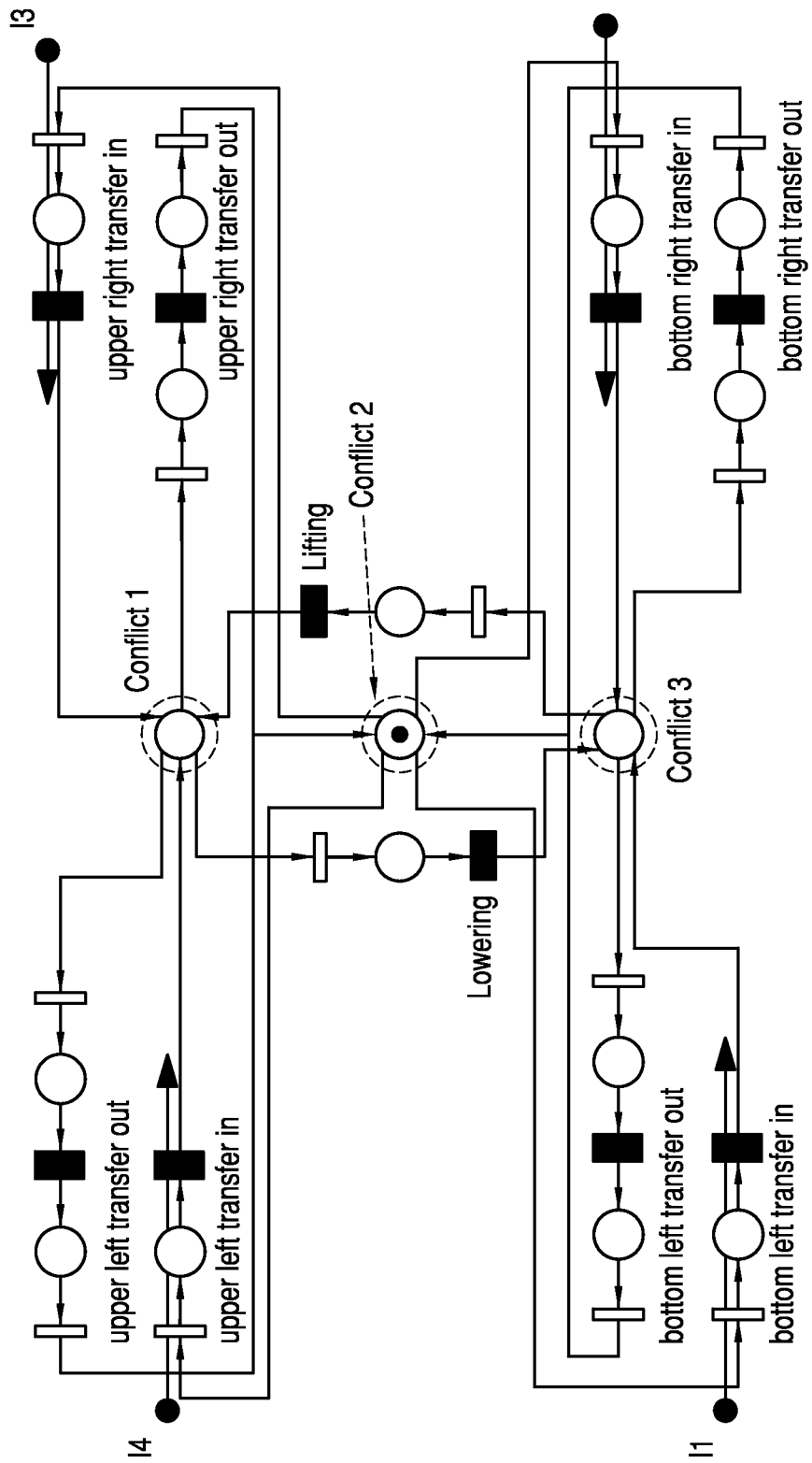
Figure 4:
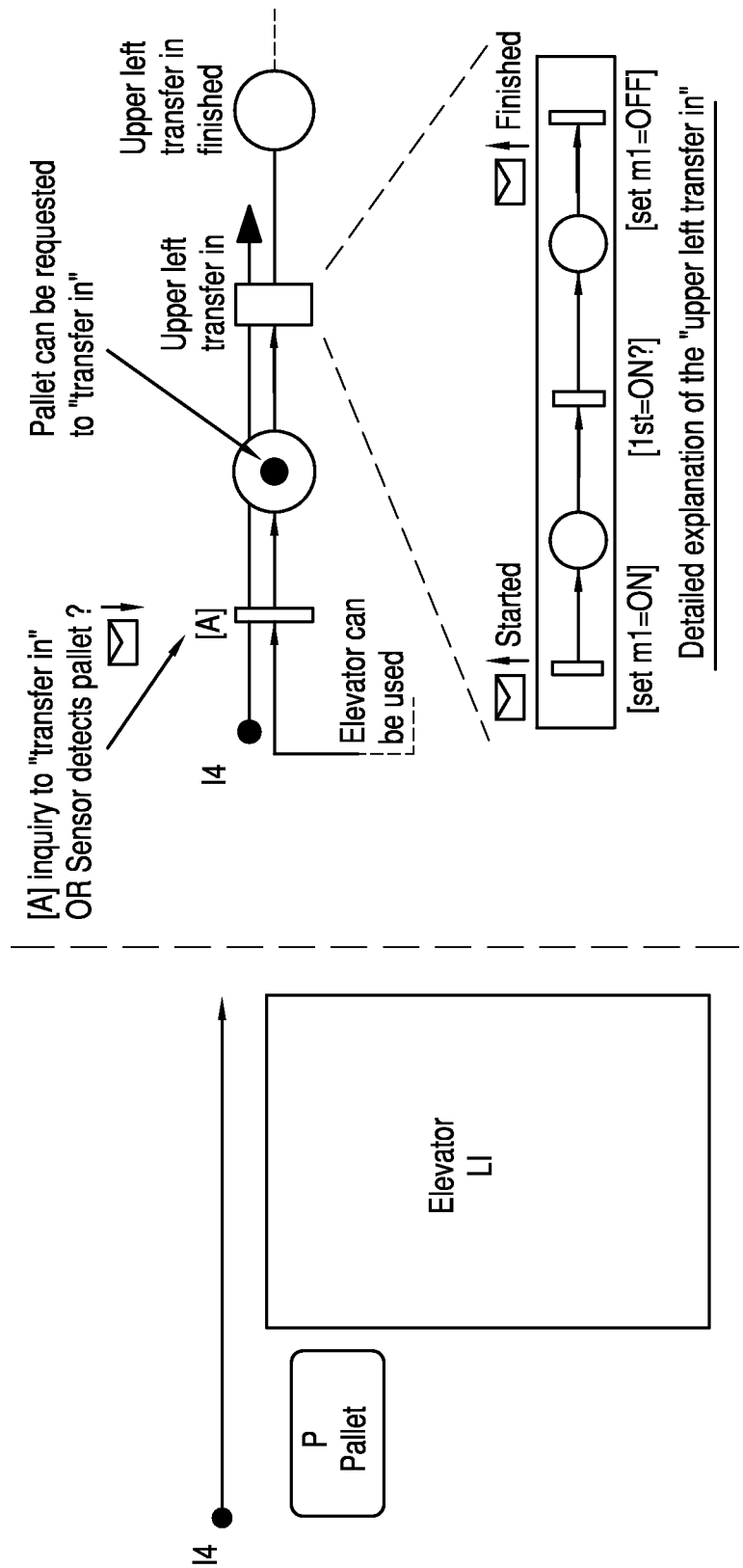
Figure 5:
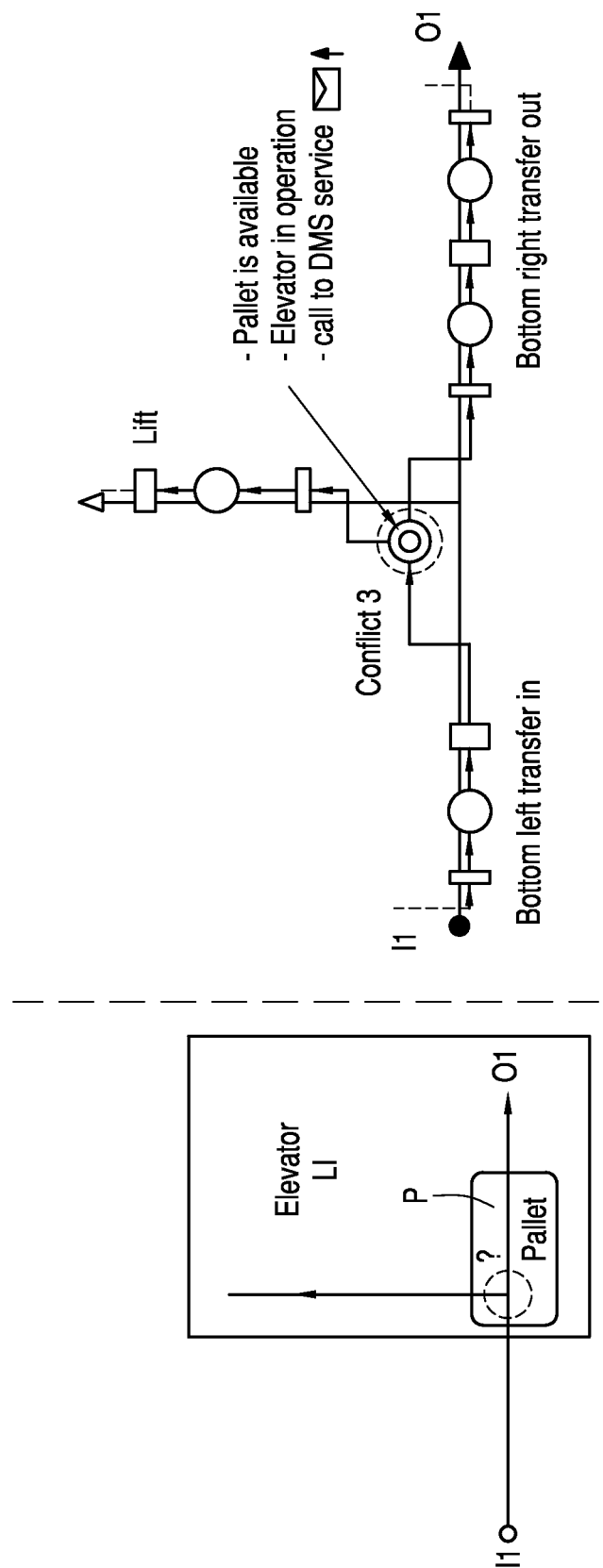

FIG. 1 shows a concept of the independent behavior of autonomous components/service-oriented automating devices, FIG. 2 shows a schematic view of an elevator with possible paths/modes of operation, FIG. 3 shows a behavior model for the elevator with possible modes of operation, FIG. 4 shows activation and operation of the service "top left transfer in" according to FIG. 3, and FIG. 5 shows a conflict situation in which conflict 3 is the current status of the model according to FIG. 3.

FIG. 1 shows a concept of the independent behavior of autonomous automating devices and/or components, whereby several procedures for the lifecycle of the operating behavior of these components are defined:

original setup of the device, including configuration, defining of services, establishment of connections to other devices/components and transfer of the latter to the waiting original status.

events are received via service operations, internal device interfaces to I/O and directly generated by the control (e.g., of conflicts).

The received event must be tested:
if the latter corresponds to a description of the current status of the control model the system is then to be developed by updating the control model, synchronization of service activities (e.g., interaction with other devices such as carrier pallet, taker-gripper), read/write to I/O, report diagnosis/monitoring indexes.

in the case of an exception and of an undocumented event or of an internal conflict a few decisions are required. If the device has the necessary information to solve the latter, special processes are used to intervene in the normal system control and new events are generated. In the case that insufficient control prevails over the event the device can ask for services that are made available by external components of the SoA (e.g., DMS) in order to make better-suited information available for a concrete decision about the problem. As an example, a pallet is to be transported and there are two possibilities and permitted paths, e.g., two services made available by the middleware: move in or move up. Both services are in a two-sided exclusion relationship, e.g., both are offered by the device but only one can be activated and operate in the end. The decision is handled by a DMS component (the latter can be arranged in the upper level of the SoA-based IT company system or integrated in a few of the devices in the manufacturing plant), that sends an execution event (habilitation event) to the selected service and a blocking event (inhibition event) to the other one, after execution of the event and development the 'token game" of the model-based middleware envelope follows, in which the system reaches the next state and is again capable of receiving other events.

The process is used on a mechatronic device that corresponds to an elevator with two levels and four different ports into which pallets can be introduced and removed. These ports should be used for connecting to other devices such as, for example, conveyor belts, but can also be triggered manually by introducing a pallet into the elevator (if a sensor detects this). FIG. 2 shows a representation of the elevator with all 12 possible expected operating modes (that correspond to the paths that can receive a pallet), that are represented in an SoA-based specification as 12 aggregated services.

The behavioral control of the elevator is formally represented by a first high-level Petri net model that shows the global method of operation in various modes (FIG. 3).

It should be noted that due to the mechatronic limitations only one pallet can be received by the elevator.

The transitions (marked in black) of the HLPN model represent a complex operation (such as, for example, a call for service). They can be atomic services that are made available by mechatronic components of the elevator or by aggregation of other atomic services (in this case they can be separated in order to achieve a deeper insight into the behavior control). If the complex service/operating mode I4-O12 is observed, this service results from the aggregation/composition of the following services (top left transfer in/top left transfer in+lift down/lift down+bottom right transfer out/bottom right transfer out).

The atomic service "top left transfer in" (see FIG. 4) implies production automating operations connected by reading/writing to corresponding I/O and synchronization of the service activity (e.g., a conveyor belt asks for this service. The activation of this transition is carried out if: 1) the model displays a logical status "true" (elevator is ready to offer a service), e.g., the elevator is available, and 2) if a conveyor belt asks for the service or a sensor detects a pallet in the port.

Other situations that are not documented can also be handled and require special procedures, as previously described.

"Transfer out" operations (such as, e.g., the "top right transfer out" transition) should be carried out synchronously with connected transfer devices (for example, conveyor belt) in order to be able to ensure a uniform transitional movement of the pallet from one device to the other. This requires that the elevator asks for a "transfer-in service" of the connected conveyor belt.

After the initial setup and the configuration of the device with the control model and additional routines the device can be used for offering/displaying services and awaits events and call-ups of services.

For example, a connected conveyor belt asks for the "bottom left transfer in" service (II). In this case and if it is a documented event in the control model, the device continues in order to develop the system by starting the HLPN model and carrying out the associated actions. After the "bottom left transfer in" service has been successfully concluded, the system must be confronted with an unusual event that was introduced by a conflict in the model (namely, conflict 3, as shown in FIG. 5). If the device does not have the necessary information for the decision it must call up specialized components in order to help in this procedure. As in FIG. 1, DMS is used for this instance. The elevator sends an inquiry (call-up service) for support to the DMS including support information (the pallet ID and possible outcomes (services that can be called up): "lift up" and "bottom right transfer out"). Based on the workflow of the pallet a decision in the form of an event is sent back to the elevator and now the latter should be capable of solving the conflict and developing the system. For example, if the elevator receives stimulations from the DMS for carrying out a "lift up", it will continue to carry out a "lift up". In any case the last decision is incumbent on the elevator, that takes the received stimulation into account but can operate differently in case of internal situations (e.g., the elevator and/or connected conveyor belts is/are busy).

The invention claimed is:

1. A process for operating autonomous, collaborative service-oriented automating devices (AG) of a production system at a manufacturing plant level as well as part of an enterprise IT system with service-oriented architecture, whereby the automating devices (AG) are coupled to production devices as well as to each other and offer functionalities of the automating devices and/or functionalities as service or aggregation of services, and/or ask for services or aggregation of services from automating devices (AG) of the manufacturing plant and/or of the enterprise IT system, whereby a setup of the automating devices (AG) is carried out comprising a configuration, definition of service and establishing of connections to other automating devices, whereby the behavior of the production system is based on the asynchronous exchange of service-events and service-calls with the goal of manufacturing a product according to a work plan, characterized in that the behavior of each automating device (AG) is represented by a part of a middleware envelope that is formally specified by a HLPN (High Level Petri Net) model and is controlled by internal and/or external service-events and service calls, that a service-event received by an automating device (AG) is tested, whereby if the service-event corresponds to a description of a current status of the HLPN model, the production system is transferred into a new status by updating the HLPN model as well as by synchronization of service activities, whereby if the service-event is an exception, an undocumented service-event, or an internal conflict, a decision is made in such a manner that a service-event is generated if necessary information for the solution of the decision is present, and/or that services of external components (DMS) and/or of automating devices (AG) are queried in order to make information for a concrete decision available, and that after execution of the service-event and/or service-calls as well as development of the HLPN model, the production system reaches a next status and is ready for receiving further events.

2. The process according to claim 1, characterized in that status change of the system is carried out by updating the HLPN control model and synchronizing of service activities.

3. The process according to claim 1, characterized in that in order to handle exceptions, undocumented service-events or conflicts, services of a decision-making system (DMS) are queried in order to make suitable information available for a correct decision.

4. The process according to claim 1, characterized in that a service orientation as well as the event-based status change of the HLPN model of the service-oriented automating device (AG) follow rules of a "token game" of a high level Petri net.

5. The process according to claim 1, characterized in that an autonomous service-oriented control behavior is implemented in each of the automating devices (AG) which is connected to other automating devices (AG) based on the layout configuration of the manufacturing plant.

6. The process according to claim 1, characterized in that the middleware envelope makes possible behavior connections available based on the making available and/or service calls.

7. The process according to claim 1, characterized in that decision mechanisms associated with a behavior of aggregated services are influenced by information connected to the production system, including a manufacturing plant and higher-level components of the service-oriented enterprise IT system.

8. The process according to claim 1, characterized in that the complete behavior of the manufacturing plant is based on an asynchronous exchange of service-events and service-calls that are carried out by the service-oriented automating devices, and that the behavior formally follows that of the HLPN model.

* * * * *